Nov. 7, 1950          E. E. HOOD          2,529,216
HEAVY-DUTY COASTER BRAKE
Filed June 27, 1949
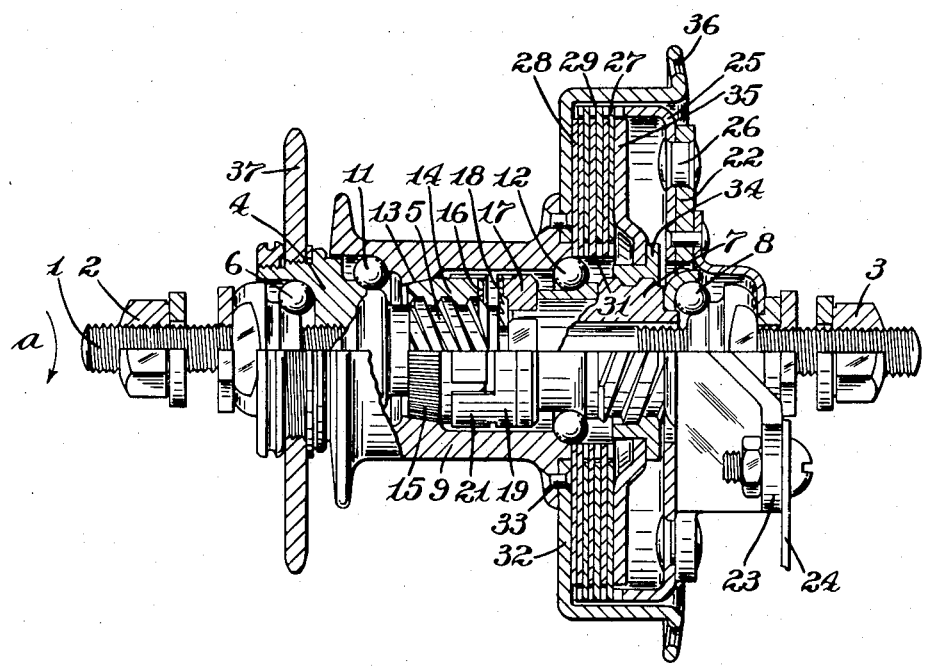
WITNESS:
Esther M. Stockton
INVENTOR.
E. Elliott Hood
BY
Clinton S. Janes.
ATTORNEY Patented Nov. 7, 1950

2,529,216

UNITED STATES PATENT OFFICE 2,529,216

HEAVY-DUTY COASTER BRAKE

Edwin Elliott Hood, Elmira, N. Y., assignor to Bendix Aviation Corporation, Elmira Heights, N. Y., a corporation of Delaware Application June 27, 1949, Serial No. 101,635

4 Claims. (Cl. 192—6)

The present invention relates to a heavy duty coaster brake for motorized bicycles and the like, and more particularly to a screw-actuated multiple-disc type of brake.

It is an object of the present invention to provide a heavy duty coaster brake which is efficient and reliable in operation, simple in construction, and easy to assemble and adjust.

It is another object to provide such a device in which the member which applies pressure to the brake discs is entirely unaffected by the braking torque, so that the brake-applying pressure is controlled freely and accurately by the force exerted by the operator, without any tendency to stick either during the application or the release of the brake.

It is another object to provide such a device which is arranged to effectively dissipate the heat generated in both the rotary and the stationary sets of brake discs.

Further objects and advantages will be apparent from the following description taken in connection with the accompanying drawing in which the figure shows a side elevation partly in section of a preferred embodiment of the invention.

In the drawing there is illustrated a fixed axle 1 which is arranged to be clamped in the frame of the vehicle not illustrated by means of the clamp nuts 2 and 3. A driving and control member 4 comprising a screw shaft 5 is journalled on the axle 1 by means of radial and thrust bearing 6. A brake actuating screw shaft 7 is also journalled on the axle 1 and is provided with a radial and thrust bearing 8 therefor. A wheel hub 9 is journalled at one end on the driving and control member 4 by means of a bearing 11 and at its other end on the brake actuating screw shaft 7 by means of a bearing 12.

The interior of the hub 9 is provided with a conical clutch surface 13, and a clutch nut 14 having a corresponding clutch surface 15 is threaded on the driving screw shaft 5 for longitudinal movement thereon into and out of clutching engagement with the interior of the hub. The clutch nut 14 is also provided with clutch teeth 16, and a clutch member 17 having corresponding clutch teeth 18 is non-rotatably mounted on the adjacent end of the brake actuating screw shaft 7. The pitch of the driving screw shaft 5 is such that forward rotation thereof causes the clutch nut 14 to be translated to the left in the figure so as to engage and drive the hub 9, whereas backward rotation of the driving screw shaft 5 will cause the clutch nut 14 to be traversed to the right into engagement with the clutch member 17 and to thereupon rotate the brake actuating screw shaft 7 backward. A spring retarder member 19 is fixed on the clutch member 17 and is provided with elastic arms 21 bearing frictionally on the periphery of the clutch nut 14 so as to insure traversal of the clutch nut upon rotation of the driving screw shaft 5.

A stationary anchor plate 22 is mounted on the axle 1 and prevented from rotation by an anchor arm 23 which is arranged to be attached to the vehicle frame by means of a clip 24. A drum member 25 is fixed to the anchor plate as by means of rivets 26, and a plurality of clutch discs 27 and 28 are splined alternately to the drum 25 as indicated at 29, and to the hub 9 as indicated at 31.

A spoke flange 32 is fixed to the hub 9 as shown at 33, and is arranged to loosely enclose the drum 25 and provide a backing surface for the clutch discs 27, 28. A nut 34 is threaded on the brake actuating screw shaft 7 and provided with a pressure disc 35 fixed thereon in any suitable way, the pitch of the threads of the screw shaft 7 being such that backward rotation thereof causes the nut 34 to be traversed to the left so as to cause the disc 35 to apply pressure to the clutch discs so as to retard the rotation of the spoke flange 32 and hub 9.

It will be noted that the brake disc 27 against which the pressure disc 35 bears is splined to the stationary drum 25 so that there is no tendency for the pressure disc 35 to be rotated from the clutch discs, and the braking torque thus has no effect on the application of pressure to the brake discs. It will further be noted that the formation of the spoke flange 32 as one of the braking elements, and so as to surround the brake discs and the stationary drum 25 permits the flange to effectively absorb the heat generated by the brake discs where it is quickly dissipated by the surface of the flange and the surfaces of the spokes which are anchored in the peripheral openings 36 in said flange.

In the operation of the device, forward rotation of the driving and control member 4 by the sprocket 37 in the direction of the arrow (a) causes the clutch nut 14 to engage the interior of the hub 9 and transmit rotation thereto. When the operator holds the sprocket 37 stationary, clutch nut 14 overruns the screw shaft 5 sufficiently to disengage from the interior of the hub; and when the operator rotates the sprocket 37 backward, the clutch nut 14 engages the clutch 17 on the brake operating screw shaft 7, rotating it backward so as to cause the nut 34 to move the pressure plate 35 against the brake discs 27 and 28 thus compressing the discs and causing retardation of the wheel hub 9.

Although but one embodiment of the invention has been shown and described in detail, it will be understood that other embodiments are possible and various changes may be made in the design and arrangement of the parts without departing from the spirit of the invention.

I claim:

1. In a coaster brake a fixed axle, a driving and control member including a screw shaft journalled thereon, a brake actuating screw shaft also journalled on the axle, a wheel hub journalled on said screw shafts, a clutch-nut threaded on the first screw shaft formed with a clutch surface adapted to engage and transmit driving torque to a similar clutch surface on the interior of the hub upon forward rotation of the driving and control members, a clutch member fixedly mounted on the brake-actuating screw shaft, said clutch nut having a corresponding clutch face adapted to engage therewith and rotate the brake-actuating screw shaft backward upon backward rotation of the driving and controlling member, a stationary anchor plate and drum on the axle, a plurality of brake discs splined alternately to the wheel hub and said drum, a spoke flange fixed to the hub, a nut threaded on the brake actuating screw shaft, and a pressure disc fixed thereon and movable thereby on backward rotation of the brake actuating screw shaft to compress the brake discs between said flange and pressure disc.

2. A coaster brake as set forth in claim 1 including further a thrust bearing for the brake-actuating screw shaft on the axle, receiving both the reaction of the brake-applying pressure of the nut threaded on said screw shaft, and the endwise pressure of the clutch nut threaded on the driving and control member.

3. A coaster brake as set forth in claim 1 in which said spoke flange is attached to the hub adjacent its splined connection with the clutch discs, and is formed to loosely surround and enclose the clutch discs and the anchor drum, so that it conducts away and dissipates the heat of the rotating clutch discs.

4. A coaster brake as set forth in claim 2 in which the anchor drum is splined to the outer periphery of the stationary clutch discs so as to receive heat therefrom, and is cooled by air circulated and cooled by the spoke flange.

E. ELLIOTT HOOD.

REFERENCES CITED

The following references are of record in the file of this patent:

UNITED STATES PATENTS

| Number | Name | Date |
|---|---|---|
| 1,212,669 | Page | Jan. 16, 1917 |
| 2,091,586 | Glacy | Aug. 31, 1937 |

FOREIGN PATENTS

| Number | Country | Date |
|---|---|---|
| 842,619 | France | Mar. 6, 1939 |